United States Patent
Huang et al.

(10) Patent No.: US 11,778,006 B2
(45) Date of Patent: Oct. 3, 2023

(54) DATA TRANSMISSION METHOD AND APPARATUS

(71) Applicant: SHANGHAI HODE INFORMATION TECHNOLOGY CO., LTD., Shanghai (CN)

(72) Inventors: Lei Huang, Shanghai (CN); Hao Wang, Shanghai (CN); Yaoqi Zhang, Shanghai (CN); Zhihui Yang, Shanghai (CN); Chunyu Long, Shanghai (CN); Menghui Wang, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/923,227

(22) PCT Filed: Dec. 29, 2020

(86) PCT No.: PCT/CN2020/141031
§ 371 (c)(1),
(2) Date: Nov. 3, 2022

(87) PCT Pub. No.: WO2021/223452
PCT Pub. Date: Nov. 11, 2021

(65) Prior Publication Data
US 2023/0188578 A1    Jun. 15, 2023

(30) Foreign Application Priority Data

May 6, 2020    (CN) .......................... 202010373539.7

(51) Int. Cl.
*H04L 65/403*    (2022.01)
*G06F 3/14*    (2006.01)
(Continued)

(52) U.S. Cl.
CPC .......... *H04L 65/403* (2013.01); *G06F 3/1454* (2013.01); *H04L 65/1069* (2013.01); *H04L 65/80* (2013.01); *H04L 67/1095* (2013.01)

(58) Field of Classification Search
CPC ..... G06F 3/1454; H04L 65/80; H04L 65/752; H04L 65/764
See application file for complete search history.

(56) References Cited

U.S. PATENT DOCUMENTS

| | | | |
|---|---|---|---|
| 10,341,238 B2 * | 7/2019 | Song ...................... | H04L 47/37 |
| 2006/0039346 A1 * | 2/2006 | Shapiro ................... | H04L 47/11 |
| | | | 370/333 |
| 2010/0321750 A1 | 12/2010 | Burinskiy et al. | |
| 2014/0118222 A1 * | 5/2014 | Barrett ............... | G01C 21/3688 |
| | | | 345/2.2 |

(Continued)

FOREIGN PATENT DOCUMENTS

| | | |
|---|---|---|
| CN | 106851408 A | 6/2017 |
| CN | 107342848 A | 11/2017 |

(Continued)

OTHER PUBLICATIONS

International Patent Application No. PCT/CN2020/141031; Int'l Search Report; dated Mar. 17, 2021; 2 pages.

*Primary Examiner* — Jonathan A Bui
(74) *Attorney, Agent, or Firm* — BakerHostetler

(57) ABSTRACT

The present application discloses a data transmission method, including: receiving a screen mirroring request from a screen mirroring terminal device, and establishing an audio and video data connection channel with the screen mirroring terminal device; obtaining audio and video data through the audio and video data connection channel and playing the audio and video data; monitoring a network status of the audio and video data connection channel; and when the network status deteriorates, selecting a transmis- (Continued)

Screen mirroring terminal 2

Computer device 1 sion mode from preset transmission strategies corresponding to an indicator value of the network status and performing the transmission mode.

18 Claims, 3 Drawing Sheets

(51) Int. Cl.
  *H04L 65/1069*   (2022.01)
  *H04L 65/80*    (2022.01)
  *H04L 67/1095*   (2022.01)

(56) References Cited

U.S. PATENT DOCUMENTS

| | | | |
|---|---|---|---|
| 2016/0112673 A1* | 4/2016 | Feng | H04L 65/403 |
| | | | 348/14.08 |
| 2020/0107069 A1* | 4/2020 | Sudak | H04N 21/6375 |
| 2020/0329388 A1* | 10/2020 | Gogoi | H04L 65/762 |
| 2020/0374238 A1* | 11/2020 | Momchilov | H04L 69/22 |
| 2021/0297897 A1* | 9/2021 | Cunningham | H04L 1/1825 |

FOREIGN PATENT DOCUMENTS

| | | |
|---|---|---|
| CN | 109525889 A | 3/2019 |
| CN | 109922205 A | 6/2019 |
| CN | 110519632 A | 11/2019 |
| CN | 110740288 A | 1/2020 |
| CN | 111628847 A | 9/2020 |
| EP | 2985938 A2 | 2/2016 |

* cited by examiner

DATA TRANSMISSION METHOD AND APPARATUS

CROSS-REFERENCE TO RELATED APPLICATIONS

This application is the U.S. National Stage of International Application No. PCT/CN2020/141031, filed on Dec. 29, 2020, which claims priority to Chinese Patent Application No. 202010373539.7, entitled "DATA TRANSMISSION METHOD AND APPARATUS" filed with the China National Intellectual Property Administration on May 6, 2020, both of which are incorporated herein by reference in their entireties.

TECHNICAL FIELD

The present application relates to the field of Internet technologies, and in particular, to a data transmission method and apparatus, a computer device, and a computer-readable storage medium.

BACKGROUND

With the development of computer technologies, more and more types of electronic devices are developed and widely used. Various types of electronic devices have respective device features. For example, a mobile phone has better portability, a television screen has a better display effect, and a speaker has better sound quality. To make full use of device features of different electronic devices, displayed content may be switched between and displayed on a plurality of electronic devices in a manner such as screen mirroring. The inventor is aware that in the related art, delays and freezes often occur during screen mirroring, resulting in a poor display effect.

SUMMARY

The present application provides a data transmission method and apparatus, a computer device, and a computer-readable storage medium, to resolve problems of delays and freezes during screen mirroring in the related art.

First, to achieve the foregoing objective, the present application provides a data transmission method, including:

receiving a screen mirroring request from a screen mirroring terminal device, and establishing an audio and video data connection channel with the screen mirroring terminal device; obtaining audio and video data through the audio and video data connection channel and playing the audio and video data; monitoring a network status of the audio and video data connection channel; and in a case that the network status deteriorates, selecting a corresponding transmission mode from a preset transmission strategy according to an indicator value of the network status and performing the transmission mode.

In an example, the monitoring a network status of the audio and video data connection channel includes: monitoring a preset first quantity of sampling points or sampling points within a preset time interval; and in a case that a quantity of sampling points having indicator values deviating from a corresponding indicator value standard is greater than or equal to a preset second quantity, indicating that the network status deteriorates.

In an example, the network status at least includes at least one indicator value of a packet loss rate, a delay, a jitter, or a bandwidth.

In an example, the monitoring a network status of the audio and video data connection channel includes: collecting statistics of sequence numbers and receiving time of data packets received within a preset time interval, to obtain a packet loss rate and a delay of the time interval.

In an example, the monitoring a network status of the audio and video data connection channel includes: collecting statistics of sequence numbers and receiving time of data packets received within a preset time interval; establishing a data packet receiving time prediction curve according to receiving time of first n data packets within the time interval, and predicting receiving time of an $(n+1)^{th}$ data packet according to the data packet receiving time prediction curve, where $1<n<N$, $n++$, and N is a quantity of all data packets within the time interval; and calculating a jitter of the time interval according to actual receiving time and the predicted receiving time of the $(n+1)^{th}$ data packet.

In an example, the selecting a corresponding transmission mode from a preset transmission strategy according to an indicator value of the network status and performing the transmission mode includes: in a case that the jitter is greater than a first threshold, enabling a first dynamic cache to cache received data packets of the audio and video data; and in a case that the jitter is greater than a second threshold, enabling a second dynamic cache to cache the received data packets of the audio and video data, where the second threshold is greater than the first threshold, and the second dynamic cache is greater than the first dynamic cache.

In an example, the selecting a corresponding transmission mode from a preset transmission strategy according to an indicator value of the network status and performing the transmission mode includes: performing data packet transmission in a forward error correction mode in a case that the packet loss rate is high and the bandwidth is sufficient; performing data packet transmission in a packet loss retransmission mode in a case that the packet loss rate is high, the bandwidth is insufficient, and the delay is short; and in a case that the packet loss rate is high, the bandwidth is insufficient, and the delay is long, performing data packet transmission in the packet loss retransmission mode, and reducing a transmission bit rate and a display resolution.

In addition, to achieve the foregoing objective, the present application further provides a data transmission apparatus, including:

an establishment module, configured to: receive a screen mirroring request from a screen mirroring terminal device, and establish an audio and video data connection channel with the screen mirroring terminal device; a playback module, configured to obtain audio and video data through the audio and video data connection channel and play the audio and video data; a monitoring module, configured to monitor a network status of the audio and video data connection channel; and an execution module, configured to: in a case that the network status deteriorates, select a corresponding transmission mode from a preset transmission strategy according to an indicator value of the network status and perform the transmission mode.

Further, the present application further provides a computer device, including a memory and a processor, the memory storing computer-readable instructions executable on the processor, the computer-readable instructions, when executed by the processor, causing the processor to implement the following steps:

receiving a screen mirroring request from a screen mirroring terminal device, and establishing an audio and video data connection channel with the screen mirroring terminal device; obtaining audio and video data through the audio and video data connection channel and playing the audio and video data; monitoring a network status of the audio and video data connection channel; and in a case that the network status deteriorates, selecting a corresponding transmission mode from a preset transmission strategy according to an indicator value of the network status and performing the transmission mode.

Further, to achieve the foregoing objective, the present application further provides a computer-readable storage medium, storing computer-readable instructions, the computer-readable instructions, when executed by at least one processor, causing the at least one processor to perform the following steps:

receiving a screen mirroring request from a screen mirroring terminal device, and establishing an audio and video data connection channel with the screen mirroring terminal; obtaining audio and video data through the audio and video data connection channel and playing the audio and video data; monitoring a network status of the audio and video data connection channel; and in a case that the network status deteriorates, selecting a corresponding transmission mode from a preset transmission strategy according to an indicator value of the network status and performing the transmission mode.

According to the data transmission method and apparatus, the computer device, and the computer-readable storage medium provided in the present application, a screen mirroring request from a screen mirroring terminal device can be received, and an audio and video data connection channel with the screen mirroring terminal device is established; audio and video data is obtained through the audio and video data connection channel and is played; and then a network status of the audio and video data connection channel is monitored, and in a case that the network status deteriorates, a corresponding transmission mode is selected from a preset transmission strategy according to an indicator value of the network status and the transmission mode is performed. Therefore, an appropriate transmission mode can be dynamically selected according to the indicator value of the network status, thereby resolving the problems of delays and freezes and improving a display effect.

DETAILED DESCRIPTION

To make the objectives, technical solutions, and advantages of the present application clearer and more comprehensible, the present application is further described in detail below with reference to the accompanying drawings and the embodiments. It is to be understood that specific embodiments described herein are merely used to describe the present application, but are not intended to limit the present application. All other embodiments obtained by a person of ordinary skill in the art based on the embodiments of the present application without creative efforts shall fall within the protection scope of the present application.

It is to be noted that, descriptions involving, for example, "first" and "second" in the present application are merely used for a purpose of description, and shall not be understood as indicating or implying relative importance or implying a quantity of indicated technical features. Therefore, features defining "first" and "second" may explicitly or implicitly include at least one of such features. In addition, technical solutions of various embodiments may be combined with each other, but need to be based on the technical solutions that can be implemented by a person of ordinary skill in the art. In case that a combination of the technical solutions is contradictory or cannot be implemented, it should be considered that such a combination of the technical solutions does not exist or does not fall within the protection scope of the present application.

Figure 1:
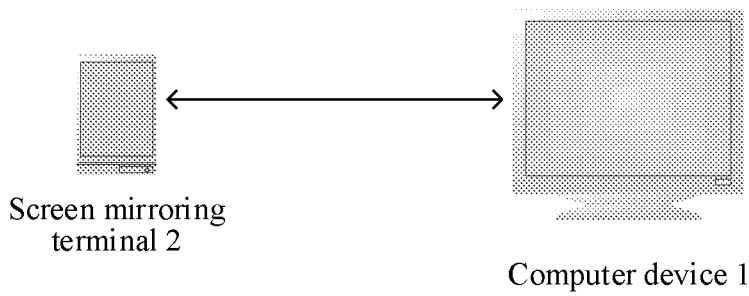
FIG. 1 is a schematic diagram of an application environment according to an embodiment of the present application.

FIG. 1 is a schematic diagram of an application environment according to an embodiment of the present application. Referring to FIG. 1, a computer device 1 is connected to a screen mirroring terminal device 2, and may receive a screen mirroring request transmitted by the screen mirroring terminal device 2, establish an audio and video data connection channel with the screen mirroring terminal device 2, and then obtain audio and video data through the audio and video data connection channel and play the audio and video data; and then monitor a network status of the audio and video data connection channel, and in a case that the network status deteriorates, select a corresponding transmission mode from a preset transmission strategy according to an indicator value of the network status and perform the transmission mode. In this embodiment, the screen mirroring terminal device 2 may be a mobile phone, a tablet computer, a portable device, or a personal computer (PC). The computer device 1 may be used as a mobile phone, a tablet computer, a portable device, a PC, or an electronic device having a display function.

Embodiment 1

Figure 2:
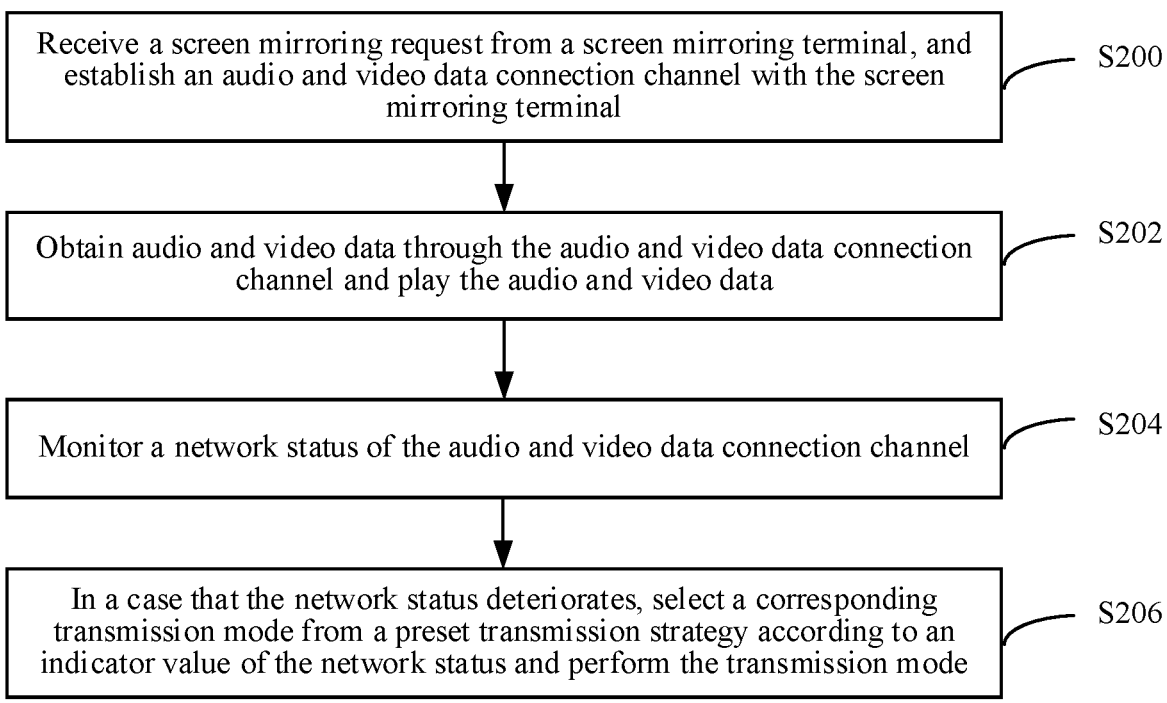
FIG. 2 is a schematic flowchart of a specific embodiment of a data transmission method according to the present application.

FIG. 2 is a schematic flowchart of an embodiment of a data transmission method according to the present application. It is to be understood that the flowchart in this method embodiment is not intended to limit a sequence of performing steps. An exemplary description is given below in which the computer device 1 is used as an execution entity.

As shown in FIG. 2, the data transmission method may include steps S200 to S206.

Step S200: Receive a screen mirroring request from a screen mirroring terminal device, and establish an audio and video data connection channel with the screen mirroring terminal device.

Step S202: Obtain audio and video data through the audio and video data connection channel and play the audio and video data.

Specifically, when a user intends to mirror the audio and video data on the screen mirroring terminal device onto the computer device 1, the screen mirroring terminal device first needs to establish a network connection with the computer device 1, and then the user transmits a screen mirroring request to the computer device 1 by using the screen mirroring terminal device. The computer device 1 receives the screen mirroring request, and then establishes an audio and video data connection channel according to the screen mirroring request. In this embodiment, audio and video data that needs to be mirrored in real time by the screen mirroring terminal device is mirrored onto the computer device 1. Therefore, the computer device 1 may obtain, through the audio and video data connection channel, audio and video data mirrored in real time. The real-time mirroring means that the screen mirroring terminal device may directly perform audio and video capturing, and then the computer device 1 may directly obtain, through the audio and video data connection channel, audio and video data captured in real time by the screen mirroring terminal device.

For real-time video streaming media, people expect audio and video data to be transmitted from one end to another end in time. A small amount of packet loss has little influence on viewing, but relatively long delays and severe freezes seriously affect viewing experience. The congestion control technology of a transmission control protocol (TCP) is not very applicable to such quick and stable streaming media transmission, and a retransmission mechanism is both inefficient and unnecessary for real-time streaming media. Therefore, a user datagram protocol (UDP)-based mode is usually used in this case.

Specifically, the screen mirroring terminal device needs to establish a connection with the computer device 1 before screen mirroring. Therefore, the screen mirroring terminal device can establish a transmission network such as a wired local area network, a Wi-Fi network, a Bluetooth network, or another mobile communication network, and then the computer device 1 joins the transmission network. The screen mirroring terminal device transmits a data link establishment request transmitted based on the UDP to the computer device 1 by using the transmission network, and the computer device 1 receives the data link establishment request to establish an audio and video data connection channel, and loads the audio and video data into a player for playback.

Step S204: Monitor a network status of the audio and video data connection channel.

Step S206: In a case that the network status deteriorates, select a corresponding transmission mode from a preset transmission strategy according to an indicator value of the network status and perform the transmission mode.

Figure 3:
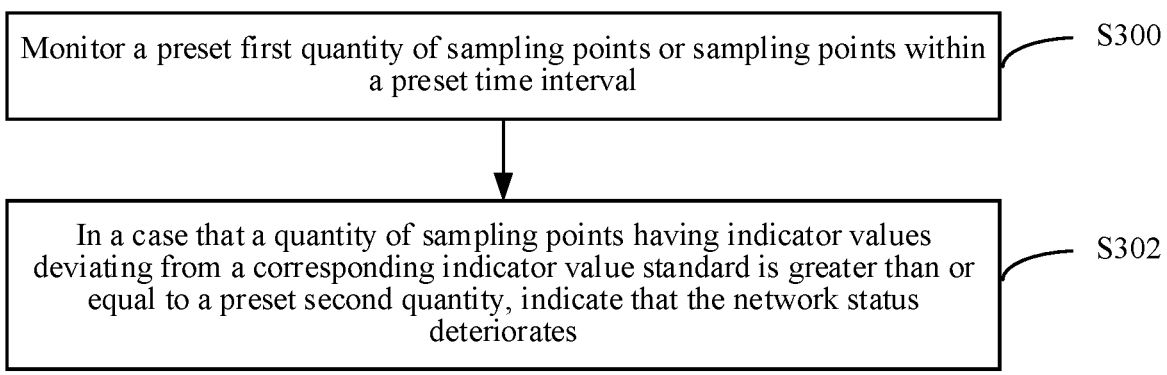
FIG. 3 is a schematic flowchart of a specific embodiment of step S204 in FIG. 2.

As shown in FIG. 3, in an exemplary embodiment, step S204 may include steps S300 and S302.

Step S300: Monitor a preset first quantity of sampling points or sampling points within a preset time interval.

Step S302: In a case that a quantity of sampling points having indicator values deviating from a corresponding indicator value standard is greater than or equal to a preset second quantity, indicate that the network status deteriorates.

In this embodiment, instead of constant switching, the network status is monitored dynamically and in real time. It is mainly considered that the strategy of continuous switching consumes resources such as a computing capability of the computer device 1. Even in an extreme case, only one point in linear statistics may deviate from prediction, and switching in such a case consumes a relatively large amount of resources. Therefore, the sampling points need to be screened. For example, 1000 sampling points or sampling points within five seconds are set for statistics. In a case that only several sampling points deviate from prediction, the switching of transmission modes is not triggered. The switching of transmission modes is performed only in a case that the sampling points meet a predetermined particular condition.

In this embodiment, the network status at least includes at least one indicator value of a packet loss rate, a delay, a jitter, or a bandwidth.

Figure 4:
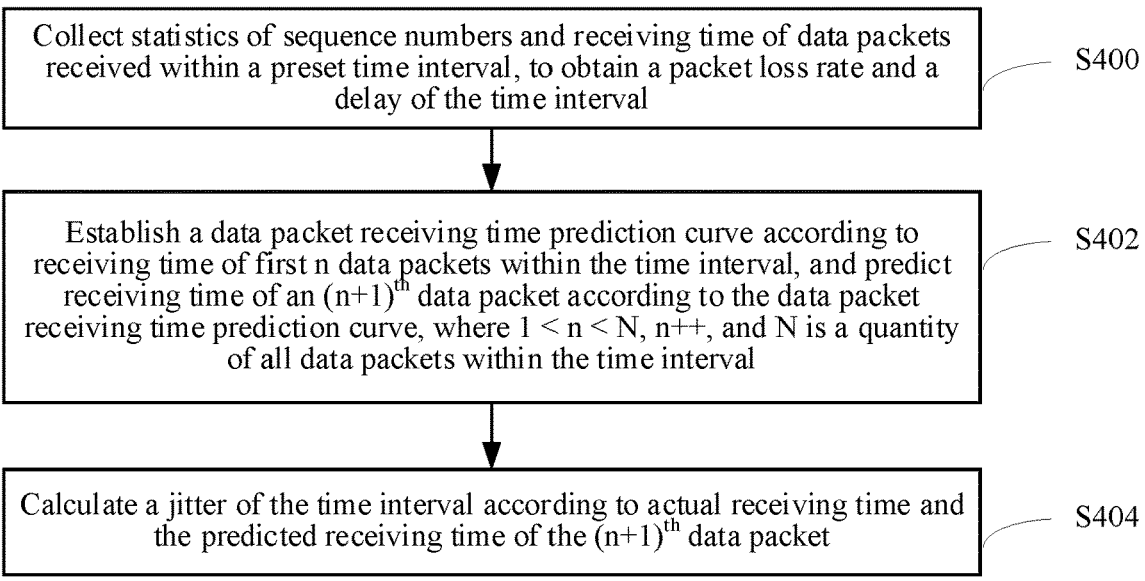
FIG. 4 is a schematic flowchart of a specific embodiment of step S204 in FIG. 2.

Therefore, as shown in FIG. 4, in an exemplary embodiment, step S204 may include steps S400 to S404.

Step S400: Collect statistics of sequence numbers and receiving time of data packets received within a preset time interval, to obtain a packet loss rate and a delay of the time interval.

Step S402: Establish a data packet receiving time prediction curve according to receiving time of first n data packets within the time interval, and predict receiving time of an $(n+1)^{th}$ data packet according to the data packet receiving time prediction curve, where $1<n<N$, $n++$, and N is a quantity of all data packets within the time interval.

Step S404: Calculate a jitter of the time interval according to actual receiving time and the predicted receiving time of the $(n+1)^{th}$ data packet.

Specifically, the screen mirroring terminal device transmits audio and video data to the computer device 1. Generally, the audio and video data is divided into a plurality of data packets for transmission, and each data packet includes a sequence number. Then, after receiving the data packets of the audio and video data transmitted by the screen mirroring terminal device, the computer device 1 combines all data packets and restores the data packets to original audio and video data according to sequence numbers of the data packets. Therefore, when each data packet is received by the computer device 1, statistics of a sequence number and receiving time of the data packet may be collected. For example, a receiving status feedback report is established to store sequence numbers and receiving time of all data packets of the audio and video data.

Therefore, the computer device 1 may directly collect statistics of whether there is a miss in the sequence numbers of the received data packets and a quantity of missing sequence numbers, to obtain the packet loss rate of the data packets; and determine whether the received data packets are late and how long the data packets are late, to obtain a delay of the data packets.

The jitter of the network may be calculated according to receiving time of adjacent data packets. In this embodiment, the computer device 1 establishes a data packet receiving time prediction curve according to receiving time of first n data packets within the time interval, and establishes a prediction curve for subsequent sampling points according to several previous sampling points. There are many mature formulas in the related art, and details are not described herein again. Then, the computer device 1 predicts receiving time of an $(n+1)^{th}$ data packet according to the data packet receiving time prediction curve, where $1<n<N$, $n++$, and N is a quantity of all data packets within the time interval; and a jitter value of the network status is represented by a difference between actual receiving time and the predicted receiving time of the $(n+1)^{th}$ data packet.

Certainly, in other embodiments, the computer device 1 may directly calculate the jitter of the network according to the delay of each data packet. For example, a delay difference between adjacent data packets is calculated as a jitter value of the data packet at a corresponding time point.

After calculating an actual value of each indicator of the network status, the computer device 1 may compare the actual value with a standard value corresponding to each preset indicator, and when the actual value deviates from and exceeds a preset value, it is considered that the network status deteriorates. Therefore, the computer device 1 further selects a corresponding transmission mode from a preset transmission strategy according to an indicator value of the network status and performs the transmission mode. In this embodiment, the computer device 1 presets a transmission strategy of automatically switching to different transmission modes when the network status includes different indicator values. Therefore, when detecting that the network status deteriorates, the computer device 1 may perform a corresponding transmission mode according to the indicator value and the transmission strategy.

Figure 5:
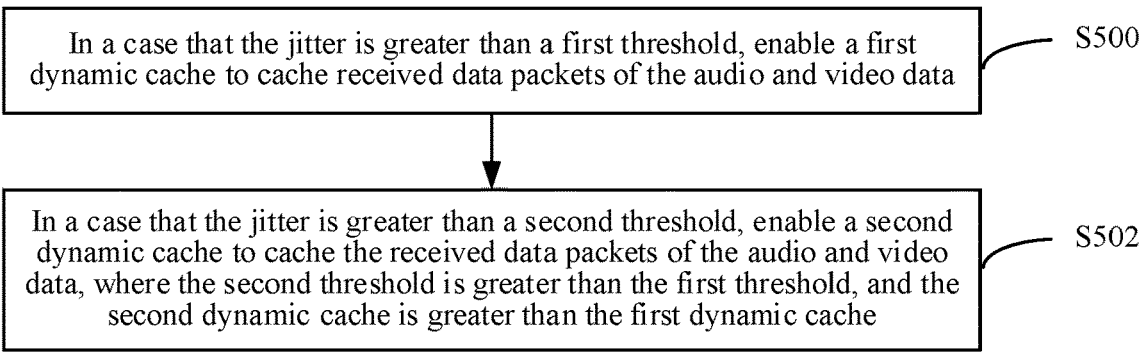
FIG. 5 is a schematic flowchart of a specific embodiment selecting a corresponding transmission mode from a preset transmission strategy according to an indicator value of a network status and performing the transmission mode in step S206 in FIG. 2.

As shown in FIG. 5, in an exemplary embodiment, the selecting a corresponding transmission mode from a preset transmission strategy according to an indicator value of the network status and performing the transmission mode in step S206 includes steps S500 and S502.

Step S500: In a case that the jitter is greater than a first threshold, enable a first dynamic cache to cache received data packets of the audio and video data.

Step S502: In a case that the jitter is greater than a second threshold, enable a second dynamic cache to cache the received data packets of the audio and video data. The second threshold is greater than the first threshold, and the second dynamic cache is greater than the first dynamic cache.

Specifically, data packet disorder and delays may occur during a severe network jitter. Therefore, the computer device 1 may correspondingly enable dynamic caches after obtaining jitter values, to store received data packets. In this embodiment, when the network is unstable (in which a jitter occurs), the computer device 1 increases lengths of the dynamic caches to cache more data, to adapt to a jitter that may occur in the future; and when the network becomes stable, the computer device 1 reduces the lengths of the dynamic caches to cache less data, to reduce an end-to-end video delay and improve real-time performance. Therefore, an operation process of the dynamic caches is a process in which the lengths of the dynamic caches are dynamically adjusted according to the jitter. In this case, an end-to-end delay can be reduced while an as smooth as possible network is ensured, that is, a better balance can be reached between a delay rate and a freeze rate.

Figure 6:
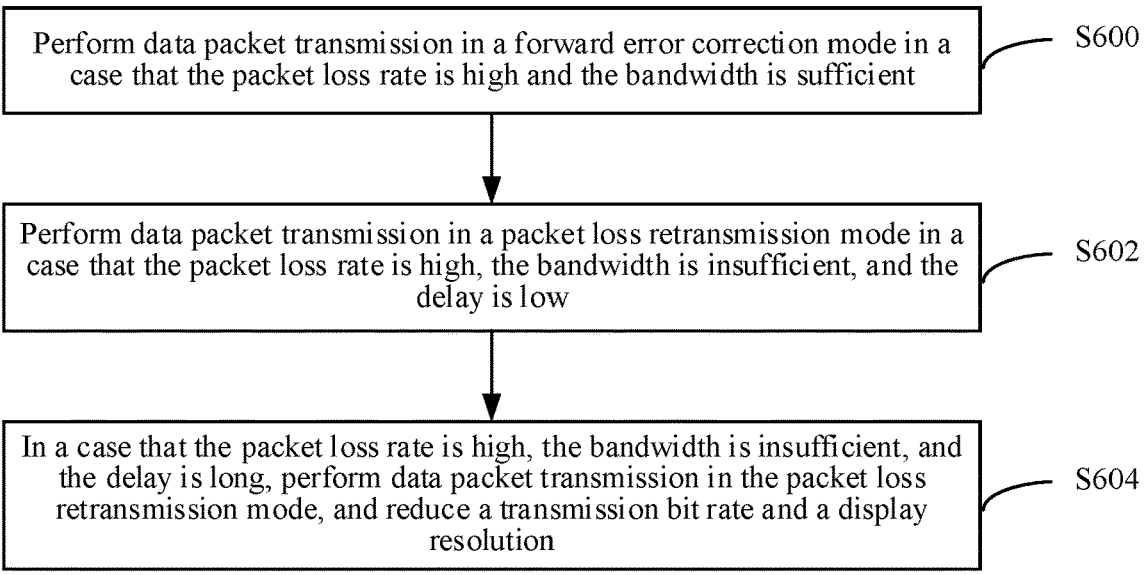
FIG. 6 is a schematic flowchart of another specific embodiment selecting a corresponding transmission mode from a preset transmission strategy according to an indicator value of a network status and performing the transmission mode in step S206 in FIG. 2.

As shown in FIG. 6, in an exemplary embodiment, the selecting a corresponding transmission mode from a preset transmission strategy according to an indicator value of the network status and performing the transmission mode in step S206 includes steps S600 to S604.

Step S600: Perform data packet transmission in a forward error correction mode in a case that the packet loss rate is high and the bandwidth is sufficient.

Step S602: Perform data packet transmission in a packet loss retransmission mode in a case that the packet loss rate is high, the bandwidth is insufficient, and the delay is short.

Step S604: In a case that the packet loss rate is high, the bandwidth is insufficient, and the delay is long, perform data packet transmission in the packet loss retransmission mode, and reduce a transmission bit rate and a display resolution.

In this embodiment, after obtaining the packet loss rate, the computer device 1 may further obtain a bandwidth value of a current network, for example, by using a bandwidth real-time speed testing technology. The computer device 1 performs data packet transmission in a forward error correction mode in a case that the packet loss rate is high and the bandwidth is sufficient. Forward error correction requires that a transmitter add a specific redundant error correction code to to-be-transmitted data for transmission together. A receiver performs error detection on the received data according to the error correction code, and the receiver performs error correction in a case that an error is detected. Although the transmission of redundancy occupies a larger network bandwidth, the packet loss rate can be reduced.

The computer device 1 performs data packet transmission in the packet loss retransmission mode in a case that the packet loss rate is high, the bandwidth is insufficient, and the delay is short. The packet loss retransmission is mainly to determine, according to sequence numbers of data packets, whether a data packet is lost, and the sequence numbers are consecutive under a normal condition. The receiver transmits a request to the transmitter if it is detected data is lost, to request the transmitter to retransmit a designated data packet. Therefore, the packet loss rate can be effectively reduced.

Certainly, if the computer device 1 obtains that the packet loss rate is high, the bandwidth is insufficient, and the delay is long, the computer device 1 may select to perform the data packet transmission in the packet loss retransmission mode and at the same time reduce a transmission bit rate and a display resolution of a display picture of a player. Therefore, the amount of data transmission can be effectively reduced, and a procedure of displaying pictures can be ensured.

Based on the above, according to the data transmission method provided in this embodiment, a screen mirroring request from a screen mirroring terminal device can be received, and an audio and video data connection channel with the screen mirroring terminal device is established; audio and video data is obtained through the audio and video data connection channel and is played; and then a network status of the audio and video data connection channel is monitored, and in a case that the network status deteriorates, a corresponding transmission mode is selected from a preset transmission strategy according to an indicator value of the network status and the transmission mode is performed. Therefore, an appropriate transmission mode can be dynamically selected according to the indicator value of the network status, thereby resolving the problems of delays and freezes and improving a display effect.

Embodiment 2

Figure 7:
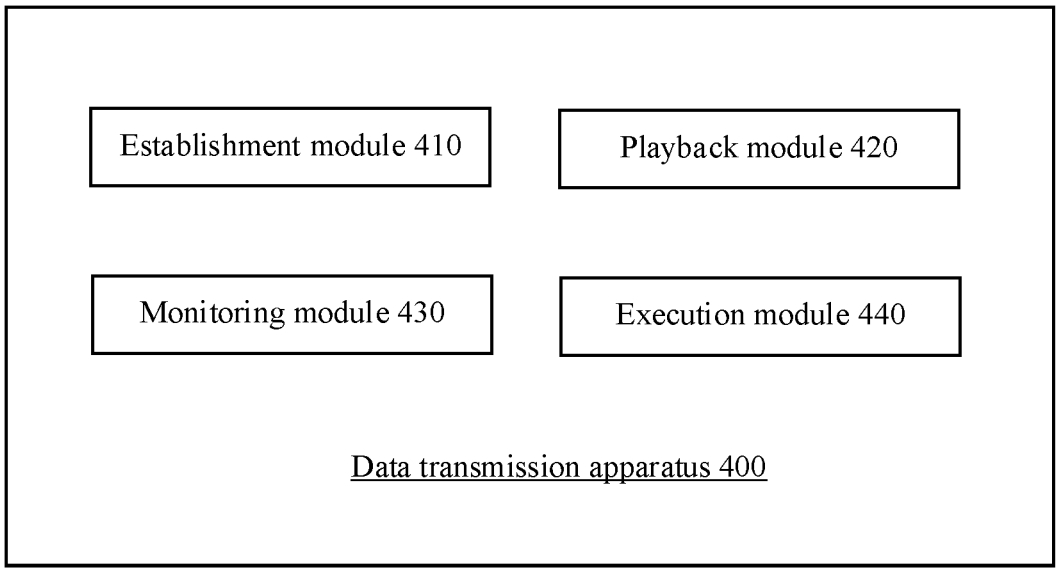
FIG. 7 is a schematic diagram of program modules of an embodiment of a data transmission apparatus according to the present application.

FIG. 7 is a schematic block diagram of a data transmission apparatus according to Embodiment 2 of the present application. The data transmission apparatus may include one or more program modules, and the one or more program modules are stored in a storage medium and executed by one or more processors to implement this embodiment of the present application. The program modules mentioned in this embodiment of the present application refer to a series of computer-readable instruction segments capable of completing specific functions. The functions of the program modules in this embodiment are described below in detail.

As shown in FIG. 7, a data transmission apparatus 400 may include an establishment module 410, a playback module 420, a monitoring module 430, and an execution module 440.

The establishment module 410 is configured to: receive a screen mirroring request from a screen mirroring terminal device, and establish an audio and video data connection channel with the screen mirroring terminal device.

The playback module 420 is configured to obtain audio and video data through the audio and video data connection channel and play the audio and video data.

The monitoring module 430 is configured to monitor a network status of the audio and video data connection channel.

The execution module 440 is configured to: in a case that the network status deteriorates, select a corresponding transmission mode from a preset transmission strategy according to an indicator value of the network status and perform the transmission mode.

In an exemplary embodiment, the monitoring module 430 is further configured to monitor a preset first quantity of sampling points or sampling points within a preset time interval; and in a case that a quantity of sampling points having indicator values deviating from a corresponding indicator value standard is greater than or equal to a preset second quantity, indicate that the network status deteriorates.

In an exemplary embodiment, the network status at least includes at least one indicator value of a packet loss rate, a delay, a jitter, or a bandwidth.

In an exemplary embodiment, the monitoring module 430 is further configured to collect statistics of sequence numbers and receiving time of data packets received within a preset time interval, to obtain a packet loss rate and a delay of the time interval; or collect statistics of sequence numbers and receiving time of data packets received within a preset time interval; establish a data packet receiving time prediction curve according to receiving time of first n data packets within the time interval, and predict receiving time of an $(n+1)^{th}$ data packet according to the data packet receiving time prediction curve, where 1<n<N, n++, and N is a quantity of all data packets within the time interval; and calculate a jitter of the time interval according to actual receiving time and the predicted receiving time of the $(n+1)^{th}$ data packet.

In an exemplary embodiment, the execution module 440 is further configured to: in a case that the jitter is greater than a first threshold, enable a first dynamic cache to cache received data packets of the audio and video data; and in a case that the jitter is greater than a second threshold, enable a second dynamic cache to cache the received data packets of the audio and video data, where the second threshold is greater than the first threshold, and the second dynamic cache is greater than the first dynamic cache; perform data packet transmission in a forward error correction mode in a case that the packet loss rate is high and the bandwidth is sufficient; perform data packet transmission in a packet loss retransmission mode in a case that the packet loss rate is high, the bandwidth is insufficient, and the delay is short; and in a case that the packet loss rate is high, the bandwidth is insufficient, and the delay is long, perform data packet transmission in the packet loss retransmission mode, and reduce a transmission bit rate and a display resolution.

Embodiment 3

Figure 8:
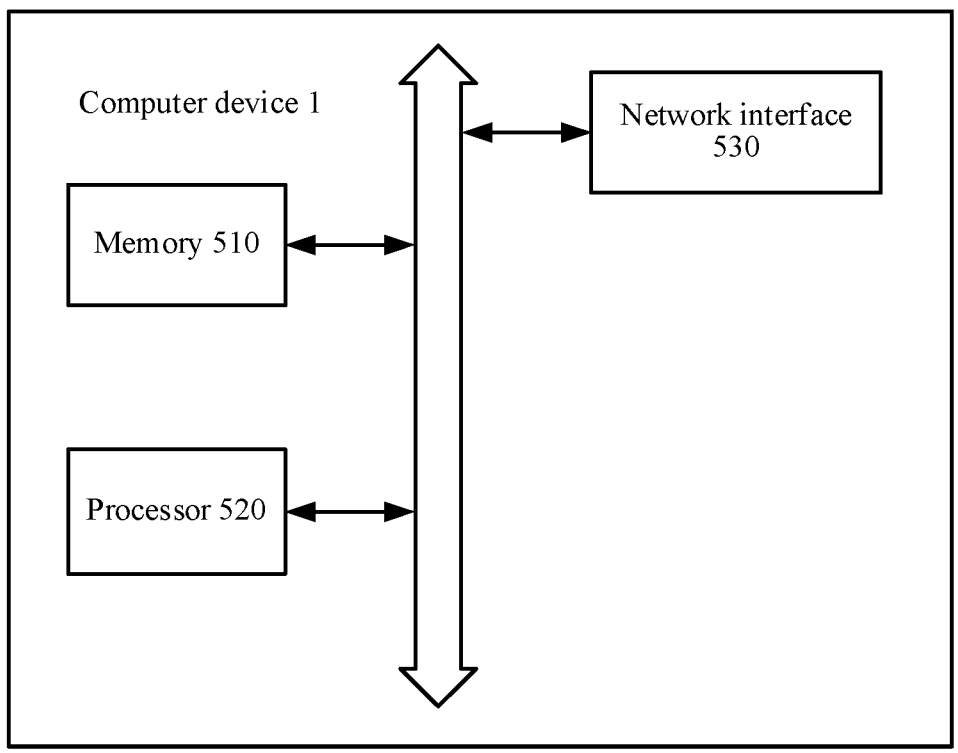
FIG. 8 is a schematic diagram of an optional hardware architecture of a computer device according to the present application.

FIG. 8 is a schematic diagram of a hardware architecture of a computer device 1 adapted to implement a data transmission method according to Embodiment 3 of the present application. In this embodiment, the computer device 1 is a device capable of automatically performing numerical calculation and/or information processing according to preset or pre-stored instructions. For example, the computer device 1 may be a rack server, a blade server, a tower server, or a cabinet server (including an independent server or a server cluster including a plurality of servers) with a gateway function. As shown in FIG. 8, the computer device 1 includes at least, but not limited to, a memory 510, a processor 520, and a network interface 530 that may be communicatively connected to each other by a system bus.

The memory 510 includes at least one type of computer-readable storage medium, and the readable storage medium includes a flash memory, a hard disk, a multimedia card, a card-type memory (for example, an SD memory or a DX memory), a random access memory (RAM), a static random access memory (SRAM), a read-only memory (ROM), an erasable programmable read-only memory (EEPROM), a programmable read-only memory (PROM), a magnetic memory, a magnetic disk, an optical disc, or the like. In some embodiments, the memory 510 may be an internal storage module of the computer device 1, for example, a hard disk or a memory of the computer device 1. In some other embodiments, the memory 510 may be an external storage device of the computer device 1, for example, a plug-in hard disk, a smart media card (SMC), a secure digital (SD) card, or a flash card that is equipped on the computer device 1. Certainly, the memory 510 may include both an internal storage module and an external storage device of the computer device 1. In this embodiment, the memory 510 is usually configured to store an operating system and various application software installed on the computer device 1, for example, program code of the data transmission method. In addition, the memory 510 is further configured to temporarily store various transmitted or to-be-transmitted data.

In some embodiments, the processor 520 may be a central processing unit (CPU), a controller, a microcontroller, a microprocessor, or another data processing chip. The processor 520 is usually configured to control general operations of the computer device 1, for example, to perform control and processing related to data interaction or communication with the computer device 1. In this embodiment, the processor 520 is configured to execute program code stored in the memory 510 or process data.

The network interface 530 may include a wireless network interface or a wired network interface. The network interface 530 is usually configured to establish a communication connection between the computer device 1 and another computer device. For example, the network interface 530 is configured to connect the computer device 1 to an external terminal device by a network and establish a data transmission channel and a communication link between the computer device 1 and the external terminal device. The network may be a wireless or wired network such as an intranet, the Internet, a Global System for Mobile Communications (GSM) network, a Wideband Code Division Multiple Access (WCDMA) network, a 4G network, a 5G network, a Bluetooth network, or a Wi-Fi network.

It is to be noted that FIG. 8 merely shows a computer device including components 510 to 530. However, it is to be understood that it is not required that all components shown in the figure are to be implemented, and more or fewer components may be alternatively implemented.

In this embodiment, the program code of the data transmission method stored in the memory 510 may further include one or more program modules and be executed by one or more processors (the processor 520 in this embodiment) to implement this embodiment of the present application.

Embodiment 4

This embodiment further provides a computer-readable storage medium, storing computer-readable instructions, the computer-readable instructions, when executed by the processor, causing the processor to implement the following steps:

receiving a screen mirroring request from a screen mirroring terminal device, and establishing an audio and video data connection channel with the screen mirroring terminal device; obtaining audio and video data through the audio and video data connection channel and playing the audio and video data; monitoring a network status of the audio and video data connection channel; and in a case that the network status deteriorates, selecting a corresponding transmission mode from a preset transmission strategy according to an indicator value of the network status and performing the transmission mode.

In this embodiment, the computer-readable storage medium includes a flash memory, a hard disk, a multimedia card, a card-type memory (for example, an SD memory or a DX memory), a RAM, an SRAM, a ROM, an EEPROM, a PROM, a magnetic memory, a magnetic disk, an optical disc, or the like. In some embodiments, the computer-readable storage medium may be an internal storage unit of a computer device, for example, a hard disk or a memory of the computer device. In some other embodiments, the computer-readable storage medium may be an external storage device of the computer device, for example, a plug-in hard disk, an SMC, an SD card, or a flash card that is equipped on the computer device. Certainly, the computer-readable storage medium may include both an internal storage unit and an external storage device of the computer device. In this embodiment, the computer-readable storage medium is usually configured to store an operating system and various application software installed on the computer device, for example, program code of the data transmission method in this embodiment. In addition, the computer-readable storage medium is further configured to temporarily store various transmitted or to-be-transmitted data.

Apparently, a person skilled in the art may understand that the foregoing modules or steps in this embodiment of the present application may be implemented by using a general-purpose computing apparatus and may be integrated in a single computing apparatus or distributed on a network including a plurality of computing apparatuses. Optionally, the modules or steps may be implemented by using program code executable by the computing apparatus, so that the modules or steps may be stored in a storage apparatus and implemented by the computing apparatus. In some cases, the shown or described steps may be implemented in a sequence different from the sequence described herein. Alternatively, the modules are respectively manufactured into various integrated circuit modules, or a plurality of modules or steps thereof are manufactured into a single integrated circuit module for implementation. In this way, the embodiments of the present application are not limited to any specific combination of hardware and software.

The foregoing descriptions are merely exemplary embodiments of the embodiments of the present application, and the protection scope of the embodiments of the present application is not limited thereto. All equivalent structure or process changes made according to the content of this specification and accompanying drawings in the embodiments of the present application or by directly or indirectly applying the embodiments of the present application in other related technical fields shall fall within the protection scope of the embodiments of the present application.

What is claimed is:

1. A data transmission method, comprising:
receiving a screen mirroring request from a screen mirroring terminal device, and establishing an audio and video data connection channel with the screen mirroring terminal device;
obtaining audio and video data through the audio and video data connection channel and playing the audio and video data;
monitoring a network status of the audio and video data connection channel;
determining a value of an indicator of the network status, wherein the indicator of the network status comprises a packet loss rate, a delay, a jitter, and a bandwidth; and
in response to determining that the network status deteriorates based on the value of the indicator, selecting a transmission mode from preset transmission strategies, the transmission mode corresponding to the value of the indicator; and
performing the transmission mode for the audio and video data connection channel.

2. The data transmission method according to claim 1, wherein the monitoring a network status of the audio and video data connection channel comprises:
monitoring a preset first quantity of sampling points or monitoring sampling points within a preset time period; and
determining that the network status deteriorates when a quantity of sampling points with indicator values deviating from a corresponding indicator value standard is greater than or equal to a preset second quantity.

3. The data transmission method according to claim 1, wherein the monitoring a network status of the audio and video data connection channel comprises:
collecting statistics of sequence numbers and receipt time of data packets received within a preset time period; and
determining a packet loss rate and a delay during the preset time period based on the collected statistics.

4. The data transmission method according to claim 1, wherein the monitoring a network status of the audio and video data connection channel comprises:
collecting statistics of sequence numbers and receipt time of data packets received within a preset time period;
establishing a prediction curve for predicting data packet receipt time based on receipt time of first n data packets within the preset time period, and predicting a receipt time of receiving an $(n+1)^{th}$ data packet based on the prediction curve, wherein $1<n<N$, and N represents a total number of all data packets received within the preset time period; and
calculating a jitter of the preset time period based on actual receipt time and the predicted receipt time of the $(n+1)^{th}$ data packet.

5. The data transmission method according to claim 1, further comprising:
enabling a first dynamic cache to cache received data packets of the audio and video data when the jitter is greater than a first threshold; and
enabling a second dynamic cache to cache the received data packets of the audio and video data when the jitter is greater than a second threshold, wherein the second threshold is greater than the first threshold, and a size of the second dynamic cache is greater than a size of the first dynamic cache.

6. The data transmission method according to claim 1, further comprising:
   performing data packet transmission in a forward error correction mode when the packet loss rate is high and the bandwidth is sufficient;
   performing data packet transmission in a packet loss retransmission mode when the packet loss rate is high, the bandwidth is insufficient, and the delay is short; and
   performing data packet transmission in the packet loss retransmission mode while reducing a transmission bit rate and a display resolution when the packet loss rate is high, the bandwidth is insufficient, and the delay is long.

7. A computer device, comprising a memory and a processor, the memory storing computer-readable instructions executable on the processor, wherein the computer-readable instructions, when executed by the processor, cause the processor to implement operations comprising:
   receiving a screen mirroring request from a screen mirroring terminal device, and establishing an audio and video data connection channel with the screen mirroring terminal device;
   obtaining audio and video data through the audio and video data connection channel and playing the audio and video data;
   monitoring a network status of the audio and video data connection channel;
   determining a value of an indicator of the network status, wherein the indicator of the network status comprises a packet loss rate, a delay, a jitter, and a bandwidth; and
   in response to determining that the network status deteriorates based on the value of the indicator, selecting a transmission mode from preset transmission strategies, the transmission mode corresponding to the value of the indicator value of the network status; and
   performing the transmission mode for the audio and video data connection channel.

8. The computer device according to claim 7, wherein the monitoring a network status of the audio and video data connection channel comprises:
   monitoring a preset first quantity of sampling points or monitoring sampling points within a preset time period; and
   determining that the network status deteriorates when a quantity of sampling points with indicator values deviating from a corresponding indicator value standard is greater than or equal to a preset second quantity.

9. The data transmission method according to claim 7, wherein the monitoring a network status of the audio and video data connection channel comprises:
   collecting statistics of sequence numbers and receipt time of data packets received within a preset time period; and
   determining a packet loss rate and a delay during the preset time period based on the collected statistics.

10. The data transmission method according to claim 7, wherein the monitoring a network status of the audio and video data connection channel comprises:
    collecting statistics of sequence numbers and receipt time of data packets received within a preset time period;
    establishing a prediction curve for predicting data packet receipt time based on receipt time of first n data packets within the preset time period, and predicting a receipt time of receiving an $(n+1)^{th}$ data packet based on the prediction curve, wherein $1<n<N$, and N represents a total number of all data packets received within the preset time period; and
    calculating a jitter of the preset time period based on actual receipt time and the predicted receipt time of the $(n+1)^{th}$ data packet.

11. The data transmission method according to claim 7, the operations further comprising:
    enabling a first dynamic cache to cache received data packets of the audio and video data when the jitter is greater than a first threshold; and
    enabling a second dynamic cache to cache the received data packets of the audio and video data when the jitter is greater than a second threshold, wherein the second threshold is greater than the first threshold, and a size of the second dynamic cache is greater than a size of the first dynamic cache.

12. The data transmission method according to claim 7, the operations further comprising:
    performing data packet transmission in a forward error correction mode when the packet loss rate is high and the bandwidth is sufficient;
    performing data packet transmission in a packet loss retransmission mode when the packet loss rate is high, the bandwidth is insufficient, and the delay is short; and
    performing data packet transmission in the packet loss retransmission mode while reducing a transmission bit rate and a display resolution when the packet loss rate is high, the bandwidth is insufficient, and the delay is long.

13. A non-transitory computer-readable storage medium, storing computer-readable instructions, wherein the computer-readable instructions, when executed by at least one processor, cause the at least one processor to perform operations comprising:
    receiving a screen mirroring request from a screen mirroring terminal device, and establishing an audio and video data connection channel with the screen mirroring terminal device;
    obtaining audio and video data through the audio and video data connection channel and playing the audio and video data;
    monitoring a network status of the audio and video data connection channel;
    determining a value of an indicator of the network status, wherein the indicator of the network status comprises a packet loss rate, a delay, a jitter, and a bandwidth; and
    in response to determining that the network status deteriorates based on the value of the indicator, selecting a transmission mode from preset transmission strategies, the transmission mode corresponding to the value of the indicator value of the network status; and
    performing the transmission mode for the audio and video data connection channel.

14. The non-transitory computer-readable storage medium according to claim 13, wherein the monitoring a network status of the audio and video data connection channel comprises:
    monitoring a preset first quantity of sampling points or monitoring sampling points within a preset time period; and
    determining that the network status deteriorates when a quantity of sampling points with indicator values deviating from a corresponding indicator value standard is greater than or equal to a preset second quantity.

15. The non-transitory computer-readable storage medium according to claim 13, wherein the monitoring a network status of the audio and video data connection channel comprises:

collecting statistics of sequence numbers and receipt time of data packets received within a preset time period; and determining a packet loss rate and a delay during the preset time period based on the collected statistics.

16. The non-transitory computer-readable storage medium according to claim 13, wherein the monitoring a network status of the audio and video data connection channel comprises:

collecting statistics of sequence numbers and receipt time of data packets received within a preset time period;

establishing a prediction curve for predicting data packet receipt time based on receipt time of first n data packets within the preset time period, and predicting a receipt time of receiving an $(n+1)^{th}$ data packet based on the prediction curve, wherein $1<n<N$, and N represents a total number of all data packets received within the preset time period; and calculating a jitter of the preset time period based on actual receipt time and the predicted receipt time of the $(n+1)^{th}$ data packet.

17. The non-transitory computer-readable storage medium according to claim 13, the operations further comprising:

enabling a first dynamic cache to cache received data packets of the audio and video data when the jitter is greater than a first threshold; and enabling a second dynamic cache to cache the received data packets of the audio and video data when the jitter is greater than a second threshold, wherein the second threshold is greater than the first threshold, and a size of the second dynamic cache is greater than a size of the first dynamic cache.

18. The non-transitory computer-readable storage medium according to claim 13, the operations further comprising:

performing data packet transmission in a forward error correction mode when the packet loss rate is high and the bandwidth is sufficient;

performing data packet transmission in a packet loss retransmission mode when the packet loss rate is high, the bandwidth is insufficient, and the delay is short; and performing data packet transmission in the packet loss retransmission mode while reducing a transmission bit rate and a display resolution when the packet loss rate is high, the bandwidth is insufficient, and the delay is long.

\* \* \* \* \*